(12) United States Patent
Nett

(10) Patent No.: US 7,302,873 B2
(45) Date of Patent: Dec. 4, 2007

(54) ANGLE DRIVE WITH POWER DISTRIBUTION

(75) Inventor: Hans-Peter Nett, Adenau (DE)

(73) Assignee: GKN Automotive GmbH (DE)

( * ) Notice: Subject to any disclaimer, the term of this patent is extended or adjusted under 35 U.S.C. 154(b) by 355 days.

(21) Appl. No.: 11/118,661

(22) Filed: Apr. 29, 2005

(65) Prior Publication Data
US 2005/0193851 A1 Sep. 8, 2005

Related U.S. Application Data

(63) Continuation of application No. 10/204,660, filed on Dec. 18, 2002, now Pat. No. 6,889,572.

(30) Foreign Application Priority Data

Dec. 28, 2000 (DE) ................................ 100 65 107
Nov. 21, 2001 (WO) ...................... PCT/EP01/13500

(51) Int. Cl.
F16H 1/22 (2006.01)
(52) U.S. Cl. ............................ 74/410; 74/400; 74/409; 74/416
(58) Field of Classification Search .................. 74/400, 74/402, 406, 409, 410, 416, 417
See application file for complete search history.

(56) References Cited

U.S. PATENT DOCUMENTS 2,315,409 A * 3/1943 Fedden et al. ................. 74/410
4,270,408 A * 6/1981 Wagner ........................ 74/661
5,239,880 A 8/1993 Hawkins et al.
6,260,429 B1 * 7/2001 Andrei ......................... 74/410

FOREIGN PATENT DOCUMENTS

GB 546630 7/1942
JP 5845448 3/1983

* cited by examiner

Primary Examiner—William C. Joyce

(57) ABSTRACT

An angle drive having a housing (11) with a first axis ($A_1$) for bearing means and a second axis ($A_2$) for bearing means, which latter axis ($A_2$) intersects the first axis ($A_1$) at right angles, having an input shaft 16 which is supported in the housing, which carries an input ring gear (19) and is positioned on the first axis ($A_1$), having an output shaft (28) which is supported in the housing, which carries an output gearwheel (27) and is positioned on the second axis ($A_2$), having a counter ring gear 20 which is supported in the housing, which is positioned on the first axis ($A_1$) and which, with reference to the second axis ($A_2$) is arranged and designed symmetrically relative to the input ring gear (19), having at least one intermediate gearwheel which is supported in the housing, which is arranged on an axis ($A_3$, A4) positioned radially relative to the first axis ($A_1$) and in one plane together with the second axis ($A_2$) and which is provided with the same type of toothing as the output gearwheel (27). The counter ring rear (20) is supported so as to be independently rotatable relative to the input ring rear (19). The input ring gear (19) and the counter ring gear (20), via their respective teeth, simultaneously engage the output gearwheel (27) and the at least one intermediate gearwheel.

28 Claims, 2 Drawing Sheets

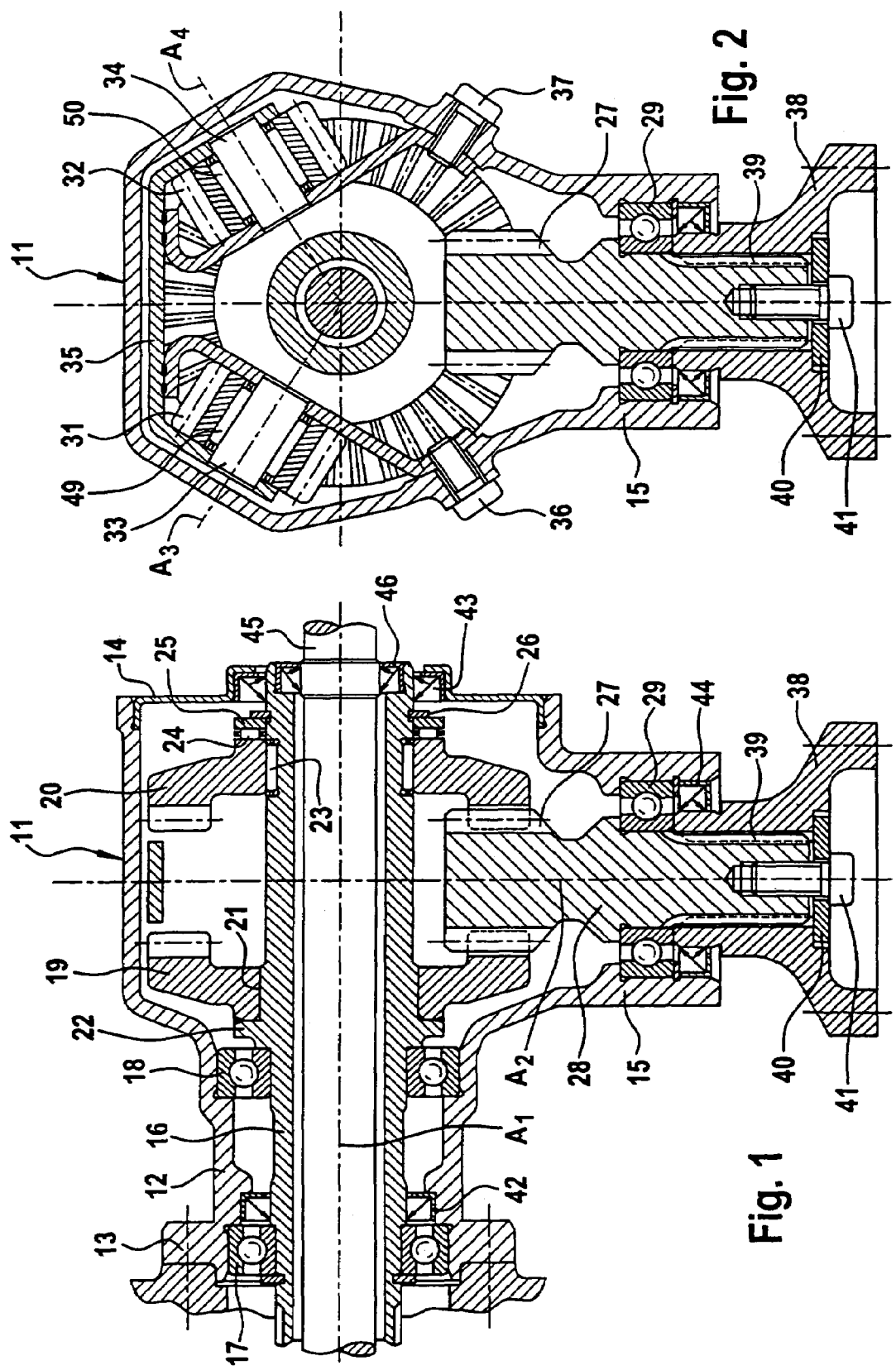

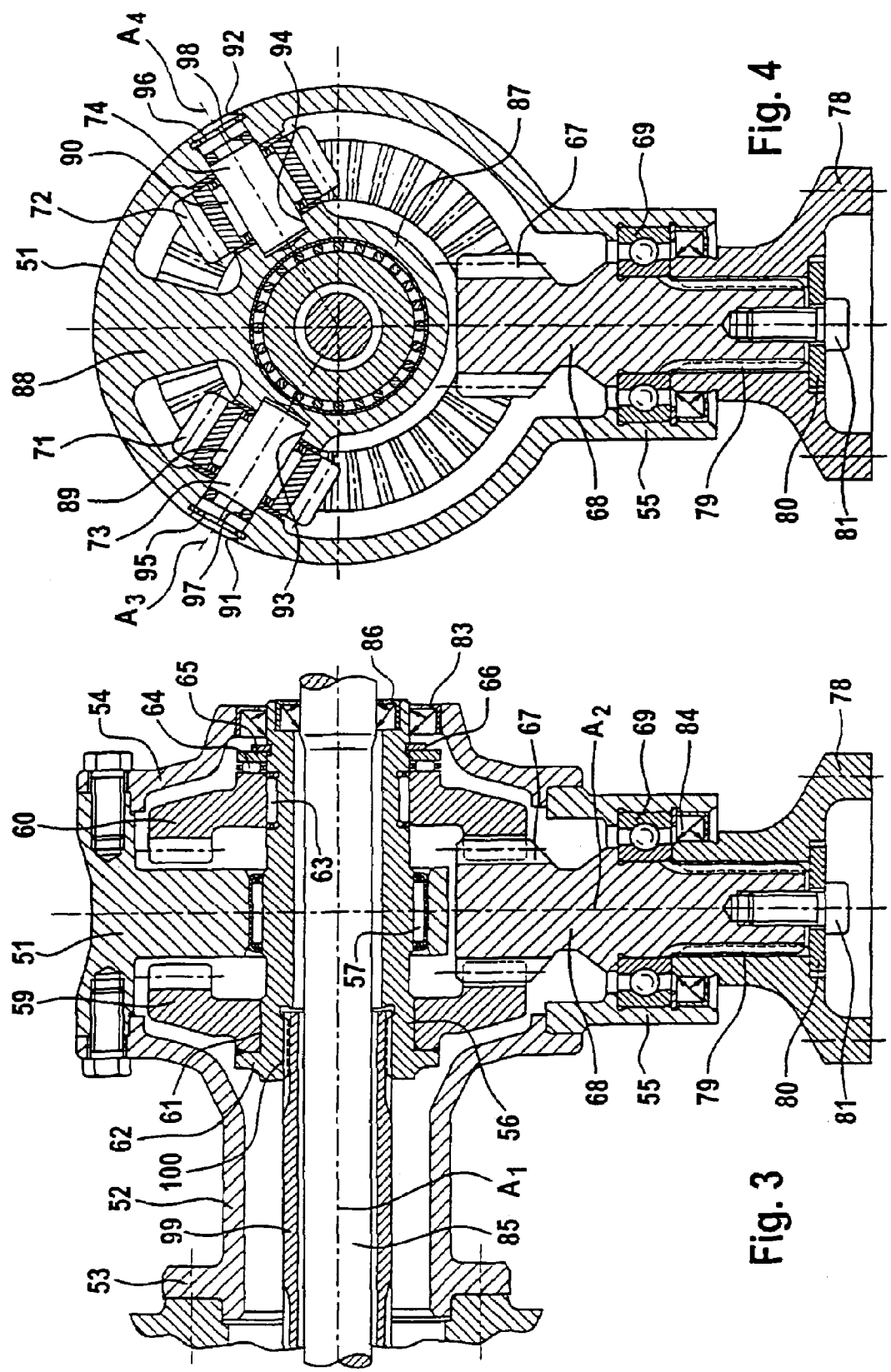

ANGLE DRIVE WITH POWER DISTRIBUTION

This is a Continuation of U.S. patent application Ser. No. 10/204,660 filed on Dec. 18, 2002 now U.S. Pat. No. 6,889,572.

BACKGROUND OF THE INVENTION

The invention relates to an angle drive having a housing with a first axis $A_1$ for bearing means and a second axis $A_2$ for bearing means, which latter axis $A_2$ intersects the first axis $A_1$ at right angles, having an input shaft which is supported in the housing, which carries an input ring gear and is positioned on the first axis $A_1$, having an output shaft, which carries an output gearwheel and is positioned on the second axis $A_2$. Angle drives can be used in many ways in motor vehicles, land machinery and machines tools, just to mention a few application examples. In the field of motor vehicle technology, they are required in four wheel drive vehicles with transversely built-in front engines. As a rule, such vehicles are derived from basic models with a front wheel drive only. In such cases, the angel drive directly follows a differential drive of the front axle, with the input shaft of the angle drive being firmly coupled to the differential carrier of the differential drive. The input shaft of the angle drive is provided in the form of a hollow shaft through which one of the sideshafts of the differential drive leads to the front axle drive.

The installation space of the angle drive to be accommodated in this way between the front axle differential and a drive-shaft behind or underneath the combustion engine is naturally very limited. Because of an ever increasing use of diesel engines with a high torque, the previously used angle drives reach their performance limit, i.e. in maximum torque test runs, the required service life is no longer reached. Because of the limited installation space, the size of the angle drive cannot be increased, and it has to be taken into account that the transferable torque of angle drives is primarily determined by the ring gear diameter which cannot be increased.

SUMMARY OF THE INVENTION

It is an object of the present invention to provide an angle drive, especially for said preferred application, which comprises a higher torque capacity in a given installation space, especially with a limited diameter dimension.

For this purpose, there is provided an angle drive with the following characteristics:

having a counter ring gear which is supported in the housing, which is positioned on the first axis $A_1$ and which, with reference to the second axis $A_2$, is arranged and designed symmetrically relative to the input ring gear (large gearwheels), having at least one intermediate gearwheel which is supported in the housing, which is arranged on an axis $A_3$, $A_4$ positioned radially relative to the first axis $A_1$ and in one plane together with the second axis $A_2$ and which is provided with the same type of toothing as the output gearwheel (pinions), the counter ring gear is supported so as to be independently rotatable relative to the input ring gear, the input ring gear and the counter ring gear (large gearwheels), via their respective teeth, simultaneously engage the output gearwheel and the at least one intermediate gearwheel (pinions).

In said angle drive, the above means achieve a power distribution which, because the output gearwheel is engaged twice, i.e. by the input ring gear on the one hand and by the counter ring gear on the other hand, leads to the tooth forces at the former being halved. The input ring gear and the counter ring gear which, substantially, are of identical design, are subjected substantially to the same loads. Because they simultaneously engage the output gearwheel and the at least one intermediate gearwheel, their tooth forces are at least halved.

By halving or dividing into three the tooth forces with a given ring gear diameter, with an unchanged toothing shape and the same tooth strength, the transferable torque can ideally be doubled. In this way, by using high-torque diesel engines, the problems existing in connection with angle drives are solved completely. The invention allows a large ring gear at the differential carrier to be replaced by smaller ring gears in the form of an input gearwheel and a counter gearwheel.

Independently of the preferred application mentioned here, an angle drive with power distribution of said type can also be used in combination with a rear axle differential. When the vehicle is driving forward, the torque flow can take place from the shaft so far referred to as output shaft to the shaft so far referred to as input shaft. This also applies to other applications.

According to a first preferred embodiment, a single intermediate gearwheel is supported co-axially relative to the second axis $A_2$. According to a further embodiment it is proposed that several, especially two intermediate gearwheels, by means of their radial axes $A_3$, $A_4$, form identical pitch angles with the second axis $A_2$.

Furthermore, it is proposed that the input shaft is a hollow shaft through which a through-shaft is able to pass; that the input shaft is supported twice in the housing; that the input ring gear and the counter ring gear on the input shaft are floatingly supported in the housing; that the counter ring gear is supported on the input shaft by means of a radial bearing; that the counter ring gear is axially supported on the input shaft by means of an axial bearing; that the output shaft is supported once in the housing; and that at least one intermediate gearwheel is rotatably supported on a fixed housing journal. Furthermore, it is possible that the input ring gear and the counter ring gear are crown wheels and that the output gearwheel and the at least one intermediate gearwheel are spur gears with straight toothing or helical toothing. The toothings can also be provided in the form of spiral toothings or as helical toothings at the input ring gear and at the counter ring gear and, accordingly, in the form of spiral or straight or helical toothings at the output gearwheel and at the intermediate gearwheels. Further possibilities consist in that the input shaft is axially floatingly supported in the housing and that there is arranged a plug-in sleeve in the journal end of the input shaft for the purpose of being connected to an output shaft of a differential.

By supporting the input ring gear and the counter ring gear on the input shaft, the housing is kept completely free from axial forces in the direction of the first axis $A_1$. If the toothing is selected in the form of crown wheels or straight spur gears, the output shaft, too, is kept completely free from forces extending in the direction of the axis $A_2$. Because of being engaged twice, i.e. by the input ring gear and by the counter ring gear, the output gearwheel is held so as to be centred between same, so that no radial bearing forces can occur at the output shaft itself. This means that, as compared to simple prior art angle drives, the load on the housing is reduced considerably, so that material savings could be possible. Furthermore, by providing the ring gearwheels in the form of crown wheels and the output and intermediate gearwheels in the form of straight pinions, the assembly procedure is simplified because the pinions can move radially towards the crown wheels without there occurring any change in the type of engagement. The requirements in respect of the accuracy of the axial position of the output gear and of the intermediate gears with reference to axes $A_2$, $A_3$ and $A_4$ are thus reduced.

The above-mentioned measures, which lead to the load on the housing being reduced, simultaneously cause the shafts and gearwheels to be acoustically uncoupled from the housing. This is an advantageous side effect which occurs automatically in the angle drive in accordance with the invention.

BRIEF DESCRIPTION OF THE DRAWINGS

Two preferred embodiments of the invention are illustrated in the drawings and will be described below.

FIG. 1 shows an inventive drive in a section through the input shaft and the output shaft in a first embodiment.

FIG. 2 shows the drive according to FIG. 1 in a section expending perpendicularly relative to the input shaft through the output shaft.

FIG. 3 shows an inventive drive in a section through the input shaft and the output shaft in a second embodiment.

FIG. 4 shows the drive according to FIG. 3 in a section extending perpendicularly relative to the input shaft through the output shaft.

DETAILED DESCRIPTION OF THE INVENTION

Below, FIGS. 1 and 2 will be described jointly. The housing 11 of an angle drive comprises a flange sleeve 12 with a threaded flange 13 having a first axis $A_1$, by means of which the angle drive can be flanged to a differential drive for example, as a well as a cover 14 positioned opposite the threaded flange 13. At the drive housing 11, there is formed on a housing sleeve 15 whose axis $A_2$ is aligned radially relative to the axis $A_1$ of the flange sleeve 12. An input shaft 16 having an axis $A_1$ and carrying an input ring gear 19 is floatingly supported by two ball bearings 17, 18 in the drive housing. The input ring gear is positioned on a seat face 21 of the input shaft 16 and is axially supported on a collar 22 to which it is welded. A counter ring gear 20 having the same type of toothing and the same size as the input ring gear 19 is positioned symmetrically relative to the latter. The counter ring gear 20 is freely rotatably supported on the input shaft 16 via a radial bearing 23 and is supported on the input shaft 16 via an axial bearing 24, a disc 25 and a securing ring 26. The input ring gear 19 and the counter ring gear 20 are provided in the form of crown wheels. Both engage an output gearwheel 27 which is formed so as to be integral with an output shaft journal 28. Said output gearwheel 27 is provided in the form of a straight spur gear. The output shaft journal 28 is supported via a ball bearing 29 in the sleeve projection 15. The output gearwheel 27 engages the input ring gear 19 and the counter ring gear 29, and this also applies to two intermediate gearwheels 31, 32 which also comprise axes $A_3$, $A_4$ which are aligned radially relative to the first axis $A_1$ and which are positioned in the same plane as the second axis $A_2$. The intermediate gearwheels 31, 32 run via needle bearings 49, 50 on rotary journals 33, 34 which are supported in a carrier structure 25 bolted into the housing 11 by means of bolts 36, 37. A connecting flange 38 is fixed by means of a disc 40 and a bolt to the end of the shaft journal 28, with the shaft journal 28 and the connecting flange 38 engaging one another by means of a shaft toothing 39. The input shaft 16 is sealed by a seal 42 relative to the threaded flange 13 and sealed by a seal 43 relative to the cover 14. Furthermore, the output shaft 28 is sealed by a seal 44 relative to the sleeve projection 15. The input shaft 16 is provided in the form of a hollow shaft, with a through-shaft 45 passing through said input shaft 16. The through-shaft 45 is sealed by a seal 46 relative to the input shaft 16. The torque introduced via the input shaft 16 is completely uniformly distributed via the intermediate gearwheels 31, 32 to the two ring gears 19, 20. The tooth forces at the ring gears 19, 20 are accommodated in the form of internal forces by the input shaft 16. The housing 11 remains completely free from axial loads in the direction of the axis $A_1$ through the input shaft 16. The ring gears 19, 20 which are floatingly arranged on the input shaft 16 are held and centered as a result of the symmetric arrangement of the gearwheels 27, 31, 32 so that no radial forces of any worthwhile value reach the housing 11 from the input shaft 16. The output gearwheel 27 is centered between the ring gears 19, 20, so that the shaft journal 28 is not subjected to any bending forces. As a result of the tooth shape (straight-toothed pinions) and the double engagement with the ring gears 19, 20, the output gear 27 and the bearing of the output shaft journal 28 are not subjected to axial forces either.

FIGS. 3 and 4 will be described jointly below. A housing 51 of an angle drive is bolted to a flange sleeve 52 which is provided with a threaded flange 53 which comprises a first axis $A_1$ and by means of which the angle drive can be flanged to a differential drive for example, as well as with a cover 54 arranged opposite the flange 52. At the drive housing 51, there is flanged on a housing sleeve 55 whose axis $A_2$ is aligned radially relative to the axis $A_1$. The annular drive housing 51, via a single radial spoke 88, holds a hub 87 which extends coaxially relative to the axis $A_1$. An input shaft 56 with an axis $A_1$ is supported in said hub 87 by means of a radial bearing 57. On one side of the bearing region, the input shaft 56 carries an input ring gear 59 which is positioned on a seat face 61 of the input shaft 56 and is axially supported on a collar 62 to which it is welded. On the other side of the bearing region and symmetrically relative to the input ring gear 59, there is positioned a counter ring gear 60 with the same tooth formation and the same size. The counter ring gear 60 is freely rotatably supported on the input shaft 56 by means of a radial bearing 63 and is supported on the input shaft by means of an axial bearing 64, a disc 65 and a securing ring 66. The input ring gear 59 and the counter ring gear 60 are provided in the form of crown wheels. Both engage an output gearwheel 67 which is formed so as to be integral with an output shaft journal 68. Said output gearwheel 67 is a straight spur gear. The output shaft journal 68 is supported by a ball bearing 69 in the sleeve projection 55. The output gearwheel 67 engages the input ring gear 59 and the counter ring gear 60, and this also applies to two intermediate gear-wheels 71, 72 which also comprise axes $A_3$, $A_4$ which are aligned radially relative to the first axis $A_1$ and which are positioned in the same plane as the second axis $A_2$. The intermediate gearwheels 71, 72 run on rotary journals 73, 74 which are supported on the radial outside in the housing 51 and on the radial inside in the hub 83. The rotary journals are secured by securing rings 95, 96 and sealed by O-rings 97, 98. The intermediate gearwheels 71, 72 are supported on needle bearings 89, 90. The input shaft 56 is connecter to a plug-in sleeve 99 via a shaft toothing 100. The input shaft 56 with the plug-in sleeve 99 is provided in the form of a hollow shaft, with a through-shaft 85 passing through same. The input shaft is sealed by a seal 83 relative to the cover 54 and the through-shaft 85 is sealed by a seal 86 relative to the input shaft 56. A connecting flange 78 is fixed by a disc 80 and a bolt 81 to the end of the output shaft 68. The shaft journal 68 and the connecting flange 78 are secured against rotation by a shaft toothing 79. Furthermore, the output shaft 68 is sealed by a seal 84 relative to the sleeve 55. The torque introduced via the input shaft 56 is completely uniformly distributed via the intermediate gearwheels 71, 72 to the two ring gears 59, 60. The tooth forces at the ring gears 59, 60 are accommodated in the form of internal forces within the input shaft 16 and hold the annular housing 51 completely free from axial loads in the direction of the axis $A_1$. Furthermore, the axially floatingly arranged input shaft 56 is held and centered as a result of the symmetric arrangement of the gearwheels 67, 71, 72, so that no radial forces of any worthwhile values reach the housing 51 from the input shaft 56. The out-put gearwheel 67 is centered between the ring gears 59, 60, so that the shaft journal 68 is not subjected to any bending forces. As a result of the tooth shape (straight-toothed pinion) and the double engagement with the ring gears 59, 60, the output gear 67 and the bearing 69 of the output shaft journal 28 are not subjected to axial forces either.

The invention claimed is:

1. An angle drive comprising:
   a housing;
   an input shaft which is supported in the housing and is positioned on a first axis ($A_1$);
   an input ring gear fixed on the input shaft;
   an output shaft which is supported in the housing, and which carries an output gearwheel and is positioned on a second axis ($A_2$) which intersects the first axis ($A_1$) at a right angle;
   a counter ring gear which is supported in the housing, which is positioned on the input shaft and which, with reference to the second axis ($A_2$), is arranged and designed symmetrically relative to the input ring gear; and
   at least one intermediate gearwheel which is supported in the housing, which is arranged on an axis ($A_3$, $A_4$) positioned radially relative to the first axis ($A_1$) and in the same plane with the second axis ($A_2$) and which is provided with the same type of toothing as the output gearwheel;
   wherein the counter ring gear is supported so as to be independently rotatable relative to the input ring gear, and wherein the input ring gear and the counter ring gear, via their respective teeth, simultaneously engage the output gearwheel and the at least one intermediate gearwheel, and
   wherein the input shaft is axially floatingly supported in the housing.

2. An angle drive according to claim 1, wherein several intermediate gearwheels, by way of respective radial axes ($A_3$, $A_4$), form identical pitch angles with the second axis ($A_2$).

3. An angle drive according to claim 1 wherein the input shaft is a hollow shaft adapted to receive a through-shaft.

4. An angle drive according to claim 1 wherein the input shaft is supported twice in the housing.

5. An angle drive according to claim 1 wherein the input ring gear and the counter ring gear on the input shaft are floatingly supported in the housing.

6. An angle drive according to claim 1 wherein the output shaft is supported once in the housing.

7. An angle drive according to claim 1 wherein at least one intermediate gearwheel is rotatably supported on a fixed housing journal.

8. An angle drive according to claim 1 wherein the input ring gear and the counter ring gear are crown wheels and that the output gearwheel and the at least one intermediate gearwheel are spur gears with straight toothing or helical toothing.

9. An angle drive according to claim 1 wherein a plug-in sleeve is arranged in the journal end of the input shaft connecting to an output shaft of a differential.

10. An angle drive according to claim 1 wherein the housing comprises a spoke supporting a hub extending coaxially with the first axis ($A_1$) and wherein the input shaft is supported by the hub.

11. An angle drive according to claim 10 comprising two intermediate gear wheels running on respective rotary journals each of which is supported at one end by the housing and at another end by the hub.

12. An angle drive according to claim 1 wherein the housing comprises, in its inside, a carrier structure and wherein the angle drive comprises two intermediate gear wheels running on respective rotary journals each of which is supported by the carrier structure.

13. An angle drive comprising:
   a housing;
   a hollow input shaft which is axially floatingly supported in the housing and is positioned on a first axis ($A_1$);
   an input ring gear fixed on the input shaft;
   an output shaft which is supported in the housing, and which carries an output gearwheel and is positioned on a second axis ($A_2$) which intersects the first axis ($A_1$) at a right angle;
   a counter ring gear which is positioned on the input shaft and which, with reference to the second axis ($A_2$), is arranged and designed symmetrically relative to the input ring gear; and
   two intermediate gearwheels each supported in the housing and arranged on an axis ($A_3$, $A_4$) positioned radially relative to the first axis ($A_1$) and in the same plane as, and forming identical pitch angles with, the second axis ($A_2$), each intermediate gearwheel having the same type of toothing as the output gearwheel;
   wherein the counter ring gear is supported so as to be independently rotatable relative to the input ring gear, and wherein the input ring gear and the counter ring gear are crown wheels which, via their respective teeth, simultaneously engage the output gearwheel and each intermediate gearwheel, the output gearwheel and the intermediate gearwheels being spur gears with straight or helical toothing.

14. An angle drive according to claim 13 wherein the housing comprises a spoke supporting a hub extending coaxially with the first axis ($A_1$) and wherein the input shaft is supported by the hub.

15. An angle drive according to claim 14 wherein the intermediate gearwheels each run on respective rotary journals supported at one end by the housing and at another end by the hub.

16. An angle drive according to claim 13 wherein the housing comprises, on its inside, a carrier structure and wherein the intermediate gearwheels each run on respective rotary journals supported by the carrier structure.

17. An angle drive comprising:
   a housing;
   an axially floating input shaft which is supported in the housing and is positioned on a first axis ($A_1$);

an input ring gear fixed on the input shaft;

an output shaft which is supported in the housing, and which carries an output gearwheel and is positioned on a second axis ($A_2$) which intersects the first axis ($A_1$) at a right angle;

a counter ring gear which is supported in the housing, which is positioned on the input shaft and which, with reference to the second axis ($A_2$), is arranged and designed symmetrically relative to the input ring gear; and at least one intermediate gearwheel which is supported in the housing, which is arranged on an axis ($A_3$, $A_4$) positioned radially relative to the first axis ($A_1$) and in the same plane with the second axis ($A_2$) and which is provided with the same type of toothing as the output gearwheel;

wherein the counter ring gear is supported so as to be independently rotatable relative to the input ring gear, and wherein the input ring gear and the counter ring gear, via their respective teeth, simultaneously engage the output gearwheel and the at least one intermediate gearwheel, wherein the counter ring gear is supported on the input shaft by a radial bearing; and wherein the counter ring gear is axially supported on the input shaft by an axial bearing.

18. An angle drive according to claim 17, wherein several intermediate gearwheels, by way of respective radial axes ($A_3$, $A_4$), form identical pitch angles with the second axis ($A_2$).

19. An angle drive according to claim 17 wherein the input shaft is a hollow shaft adapted to receive a through-shaft.

20. An angle drive according to claim 17 wherein the input shaft is supported twice in the housing.

21. An angle drive according to claim 17 wherein the input ring gear and the counter ring gear on the input shaft are floatingly supported in the housing.

22. An angle drive according to claim 17 wherein the output shaft is supported once in the housing.

23. An angle drive according to claim 17 wherein at least one intermediate gearwheel is rotatably supported on a fixed housing journal.

24. An angle drive according to claim 17 wherein the input ring gear and the counter ring gear are crown wheels and that the output gearwheel and the at least one intermediate gearwheel are spur gears with straight toothing or helical toothing.

25. An angle drive according to claim 17 wherein a plug-in sleeve is arranged in the journal end of the input shaft for connecting to an output shaft of a differential.

26. An angle drive according to claim 17 wherein the housing comprises a spoke supporting a hub extending coaxially with the first axis ($A_1$) and wherein the input shaft is supported by the hub.

27. An angle drive according to claim 26 comprising two intermediate gear wheels running on respective rotary journals each of which is supported at one end by the housing and at another end by the hub.

28. An angle drive according to claim 17 wherein the housing comprises, in its inside, a carrier structure and wherein the angle drive comprises two intermediate gear wheels running on respective rotary journals each of which is supported by the carrier structure.

* * * * *

UNITED STATES PATENT AND TRADEMARK OFFICE
CERTIFICATE OF CORRECTION

PATENT NO. : 7,302,873 B2
APPLICATION NO. : 11/118661
DATED : December 4, 2007
INVENTOR(S) : Hans-Peter Nett It is certified that error appears in the above-identified patent and that said Letters Patent is hereby corrected as shown below:

On the title page, item (57), the Abstract, at line 14, should read as follows:
-- ported in the housing, which is arranged on an axis ($A_3$, $A_4$) --

Signed and Sealed this

Fifteenth Day of April, 2008

JON W. DUDAS
*Director of the United States Patent and Trademark Office*